(12) United States Patent
Mori et al.

(10) Patent No.: US 8,802,745 B2
(45) Date of Patent: *Aug. 12, 2014

(54) POROUS RESIN BEAD AND METHOD FOR PRODUCING NUCLEIC ACID USING THE SAME

(75) Inventors: Kenjiro Mori, Osaka (JP); Eri Maeta, Osaka (JP); Tatsuya Konishi, Osaka (JP)

(73) Assignee: Nitto Denko Corporation, Osaka (JP)

( * ) Notice: Subject to any disclaimer, the term of this patent is extended or adjusted under 35 U.S.C. 154(b) by 15 days.

This patent is subject to a terminal disclaimer.

(21) Appl. No.: 12/883,684

(22) Filed: Sep. 16, 2010

(65) Prior Publication Data

US 2011/0065822 A1 Mar. 17, 2011

(30) Foreign Application Priority Data

Sep. 17, 2009 (JP) ................................. 2009-216215

(51) Int. Cl.
| | | |
|---|---|---|
| C08F 8/32 | (2006.01) | |
| C08F 212/08 | (2006.01) | |
| C08F 222/30 | (2006.01) | |
| C08F 212/14 | (2006.01) | |
| C08F 212/36 | (2006.01) | |

(52) U.S. Cl.
USPC ................ 521/146; 521/53; 521/147; 435/4; 435/6.1; 536/25.3

(58) Field of Classification Search
USPC ........................................................ 521/146
See application file for complete search history.

(56) References Cited

U.S. PATENT DOCUMENTS

| | | | | |
|---|---|---|---|---|
| 2008/0039604 A1* | 2/2008 | Konishi et al. | ................. | 526/285 |
| 2009/0326210 A1* | 12/2009 | Mori et al. | ................... | 536/25.3 |

FOREIGN PATENT DOCUMENTS

| | | | |
|---|---|---|---|
| JP | 03-068593 A | | 3/1991 |
| JP | 2005-325272 A | | 11/2005 |
| JP | 2006-342245 A | | 12/2006 |
| JP | 2008-074979 A | | 4/2008 |
| JP | 2008074979 | * | 4/2008 |
| JP | 2008074979 A | * | 4/2008 |

OTHER PUBLICATIONS

Translation of JP2008074979 provided by AIPN.*
Translation of JP 02008074979A provided by AIPN using dictionaries chemistry, natural science, and proper nouns.*
European Search Report, dated Jan. 19, 2011, issued in Application No. 10177349.7.
Current Protocols in Nucleic Acid Chemistry (2000), UNIT 3.6 Synthesis of Unmodified Oligonucleotides, pp. 3.6.1-3.6.13.
Office Action dated May 22, 2012 issued by the State Intellectual Property Office of P.R. China in counterpart Chinese Application No. 201010287425.7.
USPTO Office Action dated Mar. 13, 2013 issued in co-pending U.S. Appl. No. 12/883,501.
Communication dated Jan. 10, 2013 from the State Intellectual Property of P.R. China in counterpart Chinese application No. 201010287425.7.
Communication dated Jan. 10, 2013 from the State Intellectual Property Office of P.R. China in Chinese application No. 201010287590.2, which corresponds to related U.S. Appl. No. 12/883,501.
Office Action, dated May 22, 2012, issued by the State Intellectual Property Office of P.R. China in Chinese Application No. 201010287590.2.
Non-Final Office Action, dated May 23, 2012, issued by the U.S. Patent and Trademark Office in related U.S. Appl. No. 12/883,501.
Non-Final Office Action, dated Sep. 21, 2012, issued by the U.S. Patent and Trademark Office in related U.S. Application No. 12/883,501.
European Search Report dated Jan. 19, 2011 issued in EP 10177351.3.
Office Action, dated Mar. 21, 2013, issued by the Japanese Patent Office in Japanese Application No. 2009-216214.
Office Action, dated Mar. 21, 2013, issued by the Japanese Patent Office in counterpart Japanese Application No. 2009-216215.
Office Action dated Jul. 26, 2013 issued by the State Intellectual Property Office of the People's Republic of China in counterpart Chinese Patent Application No. 201010287425.7.
Office Action dated Jul. 26, 2013 issued by the State Intellectual Property Office of the People's Republic of China in Chinese Patent Application No. 201010287590.2.
Communication dated Feb. 8, 2014 from the State Intellectual Property Office of P.R. China in a counterpart Application No. 201010287425.7.

* cited by examiner

*Primary Examiner* — Randy Gulakowski
*Assistant Examiner* — Christina Wales
(74) *Attorney, Agent, or Firm* — Sughrue Mion, PLLC

(57) ABSTRACT

The present invention relates to a porous resin bead containing a first aromatic monovinyl compound-divinyl compound-(meth)acrylonitrile-second aromatic monovinyl compound copolymer, in which the second aromatic monovinyl compound contains a group capable of binding with a carboxyl group by dehydration condensation reaction, and in which the porous resin bead has a swelling volume in acetonitrile of from 3 to 6 ml/g.

7 Claims, No Drawings

POROUS RESIN BEAD AND METHOD FOR PRODUCING NUCLEIC ACID USING THE SAME

FIELD OF THE INVENTION

This invention relates to a porous resin bead. More illustratively, it relates to a porous resin bead which contains a first aromatic monovinyl compound-divinyl compound-(meth)acrylonitrile-second aromatic monovinyl compound copolymer. This porous resin bead is particularly useful in synthesizing nucleic acid.

BACKGROUND OF THE INVENTION

A solid-phase synthesis method which uses the phosphoramidite method is broadly used in the chemical synthesis of nucleic acids such as a DNA oligonucleotide and RNA. In this method, for example, a nucleoside which becomes the 3'-terminal of the nucleic acid to be synthesized is firstly supported in advance on a solid-phase synthesis support via a cleavable linker such as succinyl group, and this support is put into a reaction column and set on an automatic nucleic acid synthesizer. Thereafter, synthesizing reagents are fed into the reaction column, for example, in the following manner in accordance with the synthesizing program of the automatic nucleic acid synthesizer. (1) Deprotection of nucleoside 5'-OH group by a trichloroacetic acid/dichloromethane solution, dichloroacetic acid/toluene solution or the like, (2) coupling reaction of amidite with the 5'-OH group by a nucleoside phosphoramidite (nucleic acid monomer)/acetonitrile solution and an activator (tetrazole or the like)/acetonitrile solution, (3) capping of the unreacted 5'-OH group by acetic anhydride/pyridine/methyl imidazole/THF or the like, and (4) oxidation of phosphite by iodine/water/pyridine or the like.

By repeating this synthesis cycle, a nucleic acid having the intended sequence is synthesized. The finally synthesized nucleic acid cut out from the solid-phase synthesis support by hydrolyzing the cleavable linker with ammonia, methylamine or the like (cf. Non-patent Reference 1).

As the solid-phase synthesis support to be used in the synthesis of nucleic acid, CPG (Controlled Pore Glass), silica gel and the like inorganic particles have so far been used, but in recent years, resin beads which can increase quantity of nucleic acid synthesized per weight of solid-phase synthesis support have been started to be used in order to synthesize at a moderate price and in a large quantity. As such resin beads, a highly-crosslinked and non-swelling porous polystyrene bead (cf. Patent Reference 1), a low-crosslinked and swelling porous polystyrene bead (cf. Patent Reference 2) and the like can for example be mentioned.

However, when supporting amount of the nucleoside linker as the starting point of synthesis is increased to too high level in order to further increase the quantity of nucleic acid synthesized per weight of solid-phase synthesis support, it poses a problem in that the coupling efficiency of amidite becomes poor and purity of the nucleic acid obtained is considerably lowered. For example, upper limit of the nucleoside linker supporting amount of a commercially available solid-phase synthesis support, which can synthesize a DNA oligonucleotide of 20 bases in high purity, is so far about 200 µmol/g at the most.

An attempt has been made to improve nucleic acid synthesizing ability by, using acrylonitrile, suppressing a fluctuation of swelling ratio of a porous resin bead in various organic solvents (cf. Patent Reference 3). However, although the porous resin bead used in this reference is small in the fluctuation of swelling ratio of the porous resin bead in various organic solvents, further improvement is in demand regarding the nucleic acid synthesizing ability.

Patent Reference 1: JP-A-3-68593
Patent Reference 2: JP-A-2005-325272
Patent Reference 3: JP-A-2008-74979
Non-patent Reference 1: Current Protocols in Nucleic Acid Chemistry (2000), UNIT 3.6 Synthesis of Unmodified Oligonucleotides

SUMMARY OF THE INVENTION

The invention aims at providing a porous resin bead for synthesizing nucleic acid in high synthesizing quantity and with high purity.

The present inventors have found for the first time to our surprise that when, among the porous resin beads containing a first aromatic monovinyl compound-divinyl compound-(meth)acrylonitrile-second aromatic monovinyl compound copolymer, a porous resin bead where
(1) the second aromatic monovinyl compound contains a group capable of binding with carboxyl group by dehydration condensation reaction, and
(2) swelling volume in acetonitrile is from 3 to 6 ml/g,
is used in the nucleic acid synthesis as a solid-phase synthesis support, synthesized quantity of the nucleic acid obtained is increased and its purity is improved.

The inventors have further carried out intensive studies based on these findings and accomplished the invention as a result.

Thus, the present invention relates to the following porous resin beads, the method for producing a nucleic acid and the like.

(1) A porous resin bead containing a first aromatic monovinyl compound-divinyl compound-(meth)acrylonitrile-second aromatic monovinyl compound copolymer, in which the second aromatic monovinyl compound contains a group capable of binding with a carboxyl group by dehydration condensation reaction, and in which the porous resin bead has a swelling volume in acetonitrile of from 3 to 6 ml/g.
(2) The porous resin bead described in (1), in which the group capable of binding with a carboxyl group by dehydration condensation reaction is a group selected from the group consisting of an amino group, an aminoalkyl group, a hydroxyl group and a hydroxyalkyl group.
(3) The porous resin bead described in (1) or (2), in which the amount of a structural unit derived from said (meth)acrylonitrile is from 1 to 6 mmol/g.
(4) The porous resin bead described in any one of (1) to (3), in which an amount of the divinyl compound based on the total amount of monomers is from 2 to 10% by mol.
(5) The porous resin bead described in any one of (1) to (4), in which the divinyl compound is divinylbenzene.
(6) A method for producing a nucleic acid, including sequentially binding a nucleoside or nucleotide to the porous resin bead described in any one of (1) to (5) via a cleavable linker, thereby obtaining an oligonucleotide.

The porous resin bead of the invention has a high nucleic acid synthesizing quantity and nucleic acid synthesizing purity. Therefore, when the porous bead of the invention is used, it becomes possible to carry out a nucleic acid synthesis efficiently in comparison with cases where the conventional porous resin beads are used.

DETAILED DESCRIPTION OF THE INVENTION

The porous resin bead of the invention contains a first aromatic monovinyl compound-divinyl compound-(meth)

acrylonitrile-second aromatic monovinyl compound copolymer. Herein, the term "first aromatic monovinyl compound-divinyl compound-(meth)acrylonitrile-second aromatic monovinyl compound copolymer" refers to a copolymer containing structural units each derived from a first aromatic monovinyl compound, divinyl compound, (meth)acrylonitrile, and second aromatic monovinyl compound, respectively. In other words, the term "first aromatic monovinyl compound-divinyl compound-(meth)acrylonitrile-second aromatic monovinyl compound copolymer" means a copolymer obtained by copolymerizing as monomers a first aromatic monovinyl compound, divinyl compound, (meth)acrylonitrile, and second aromatic monovinyl compound.

The "first aromatic monovinyl compound", which provides one of the structural units of the porous resin bead of the invention (namely, structural units of the first aromatic monovinyl compound-divinyl compound-(meth)acrylonitrile-second aromatic monovinyl compound copolymer), means styrene or a substitution product thereof. As the substitution product of styrene, for example, there may be mentioned those compounds in which one or more hydrogen atoms of styrene are substituted with an alkyl group having from 1 to 5 carbon atoms (e.g., methyl group, ethyl group, n-propyl group, isopropyl group, n-butyl group, isobutyl group, sec-butyl group, tert-butyl group, n-amyl group, isoamyl group, sec-amyl group or tert-amyl group), a halogen atom, carboxyl group, sulfonate group, cyano group, an alkoxy group having from 1 to 5 carbon atoms (e.g., methoxy group, ethoxy group, propoxy group, butoxy group or pentyloxy group), nitro group, an acyl group (e.g., acetoxy group or benzoxy group) and the like.

As such a first aromatic monovinyl compound, for example, illustratively, there may be mentioned: styrene; a "nucleus alkyl-substituted styrene" which is a styrene of which benzene ring moiety is substituted, such as o-methylstyrene, m-methylstyrene, p-methylstyrene, 2,4-dimethylstyrene, ethylstyrene, trimethylstyrene, and p-t-butylstyrene; an "α-alkyl-substituted styrene", such as α-methylstyrene, and α-methyl-p-methylstyrene; a "nucleus halogenated styrene" which is a styrene of which benzene ring moiety is halogenated, such as chlorostyrene, dichlorostyrene, fluorostyrene, pentafluorostyrene, bromostyrene; a "halogenated alkyl styrene", such as chloromethylstyrene, and fluoromethylstyrene; an "acyloxystyrene", such as hydroxystyrene, hydroxymethylstyrene, vinyl benzoate, sodium styrenesulfonate, cyanostyrene, methoxystyrene, ethoxystyrene, butoxystyrene, nitrostyrene, acetoxystyrene, and benzoyloxystyrene; and the like, although not limited thereto. Preferred as the first aromatic monovinyl compound is styrene.

The "divinyl compound" which provides one of the structural units of the porous resin bead of the invention means an aromatic divinyl compound, a di(meth)acrylic acid ester or a substitution product thereof. As a substitution product of an aromatic divinyl compound or a substitution product of a di(meth)acrylic acid ester, there may be mentioned, for example, a compound in which one or more hydrogen atoms of the aromatic divinyl compound or di(meth)acrylic acid ester are substituted with: an alkyl group having from 1 to 5 carbon atoms; a halogen atom; carboxyl group; sulfonate group; cyano group; an alkoxy group having from 1 to 5 carbon atoms; and nitro group.

As such a divinyl compound, illustratively, for example, there may be mentioned: an aromatic divinyl compound such as divinylbenzene, methyldivinylbenzene, divinyltoluene, and divinylnaphthalene; di(meth)acrylate compounds such as ethylene glycol di(meth)acrylate, diethylene glycol di(meth)acrylate, triethylene glycol di(meth)acrylate, tetraethylene glycol di(meth)acrylate, further polyhydric ethylene glycol di(meth)acrylates, propylene glycol di(meth)acrylate, dipropylene ethylene glycol di(meth)acrylate, further polyhydric propylene glycol di(meth)acrylates, 1,2-butanediol di(meth) acrylate, 1,3-butanediol di(meth)acrylate, 1,4-butanediol di(meth)acrylate, 1,5-pentanediol di(meth)acrylate, 1,6-hexanediol di(meth)acrylate, 1,9-nonanediol di(meth)acrylate, 1,10-decanediol di(meth)acrylate, 2-methyl-1,8-octanediol di(meth)acrylate, and 1,4-cyclohexanediol di(meth)acrylate; and the like. Preferred as the divinyl compound of the invention is divinylbenzene. Regarding the divinylbenzene, o-, m- or p-divinylbenzene or a mixture thereof is preferably used as the compound providing the structural unit. Particularly preferred among them is m- or p-divinylbenzene. The divinyl compound functions as a crosslinking agent in the porous resin bead of the invention. Since there is a tendency that a porous resin bead is apt to swell when amount of a crosslinking agent is small and that its swelling ratio is lowered when the amount of the crosslinking agent is large, amount of the divinyl compound may contribute to the increase of swelling ratio.

The "(meth)acrylonitrile" which provides one of the structural units of the porous resin bead of the invention means "acrylonitrile" or "methacrylonitrile", or "both of acrylonitrile and methacrylonitrile". That is, regarding the structural unit derived from the (meth)acrylonitrile to be contained in the porous resin bead of the invention, the structural unit derived from acrylonitrile or structural unit derived from methacrylonitrile may be contained each independently or both of these units may be contained.

The "second aromatic monovinyl compound" which provides one of the structural units of the porous resin bead of the invention means styrene or a substitution product thereof that contains "a functional group capable of binding with carboxyl group by dehydration condensation reaction". Accordingly, in the case of synthesizing an objective nucleic acid, a nucleoside is connected to the porous resin bead, and when carboxyl group is present in a linker in that case, the carboxyl group of the linker can be easily connected with the porous resin bead, so that it is advantageous from the viewpoint that the nucleic acid synthesis can be carried out efficiently. As such a "functional group capable of binding with carboxyl group by dehydration condensation reaction", there can be mentioned, amino group, aminoalkyl group, hydroxyl group, hydroxyalkyl group and the like. More preferably, there can be mentioned, primary amino group, aminomethyl group, hydroxyl group, hydroxymethyl group and the like. It is preferable that the "functional group capable of binding with carboxyl group by dehydration condensation reaction" is arranged at para-position to vinyl group, but it may also be ortho- or meta-position.

As such a second aromatic monovinyl compound, for example, illustratively, there may be mentioned: aminostyrene monomer or a substitution product thereof such as aminostyrene; aminoalkylstyrene monomer or a substitution product thereof such as aminomethylstyrene; hydroxystyrene monomer or a substitution product thereof such as hydroxystyrene; hydroxyalkylstyrene monomer or a substitution product thereof such as hydroxymethylstyrene; and the like, among which p-aminostyrene, p-aminomethylstyrene, p-hydroxystyrene and p-hydroxymethylstyrene are preferred.

As the "substitution product" of hydroxystyrene monomer or aminostyrene monomer, there may be mentioned those compounds in which one or more hydrogen atom other then the "functional group capable of binding with carboxyl group by dehydration condensation reaction" are substituted with: an alkyl group having from 1 to 5 carbon atom; a halogen atom; carboxyl group; sulfonate group; cyano group; methoxy group; nitro group; and the like.

The porous resin bead of the invention may be produced by directly using a second aromatic monovinyl compound which contains the "functional group capable of binding with carboxyl group by dehydration condensation reaction" (the production method is described later) in early stage of the production, but it may also be produced by once synthesizing a porous resin bead by suspension copolymerization or the like and then introducing the "functional group capable of binding with carboxyl group by dehydration condensation reaction". Particularly, when a second aromatic monovinyl compound having hydroxy group as the "functional group capable of binding with carboxyl group by dehydration condensation reaction" is introduced as a monomer providing a structural unit of the porous resin bead of the invention (i.e., introducing hydroxystyrene as a monomer providing a structural unit of the porous resin bead of the invention), it is preferable to produce the bead by the latter production method because the hydroxystyrene itself is a very unstable monomer due to its aptness to cause polymerization and its handling and preservation therefore are not easy.

According to such a production process, as the aromatic monovinyl compound which becomes the base of the "second aromatic monovinyl compound" of the invention, there may be mentioned, for example: acylaminostyrene such as acetaminostyrene; acyloxystyrene such as acetoxystyrene, ethanoyloxystyrene, and benzoyloxystyrene; haloalkylstyrene such as chloromethylstyrene; and the like.

Structural units derived from the acyloxystyrene or acylaminostyrene in the porous resin bead synthesized by suspension copolymerization or the like can be converted into the "structural unit derived from the second aromatic monovinyl compound" as a structural unit of the porous resin bead of the invention, illustratively, structural units derived from hydroxystyrene, aminostyrene and the like, by hydrolysis with an alkali or acid. Also, the structural unit derived from haloalkylstyrene can be converted into the "structural unit derived from the second aromatic monovinyl compound" as a structural unit of the porous resin bead of the invention, illustratively, structural units derived from aminoalkylstyrene, hydroxyalkylstyrene and the like, by the reaction with phthalimide and hydrazine, ammonia, sodium hydroxide or the like. Namely, the structural unit derived from haloalkylstyrene can be converted into the structural unit derived from aminoalkylstyrene by the reaction with phthalimide and hydrazine, ammonia or the like, and the structural unit derived from haloalkylstyrene can be converted into the structural unit derived from hydroxyalkylstyrene by the reaction with sodium hydroxide or the like. It is preferable that the acyloxy group, acylamino group, haloalkyl group or the like which is converted to become the "functional group capable of binding with carboxyl group by dehydration condensation reaction" is arranged at para-position to vinyl group, but it may also be ortho- or meta-position.

Alternatively, a porous resin bead comprising a first aromatic monovinyl compound-divinyl compound-(meth)acrylonitrile compound copolymer synthesized by suspension copolymerization or the like may be subjected to post-treatment to introduce a haloalkyl group into the aromatic ring of the structural unit derived from the first aromatic monovinyl compound, subsequently converting this into the structural unit derived from an aminoalkylstyrene or hydroxyalkylstyrene. For example, chloromethyl group is introduced by adding chloromethyl ether and zinc chloride to a dispersion of the porous resin bead comprising a first aromatic monovinyl compound-divinyl compound-(meth)acrylonitrile compound copolymer and allowing them to undergo the reaction. Next, the "structural unit derived from the second aromatic monovinyl compound" is introduced through the introduction of aminomethyl group by allowing the copolymer to react with ammonia. The porous resin bead of the invention can also be obtained even via such a production process. It is preferable that the haloalkyl group is arranged at para-position to vinyl group, but it may also be at ortho- or meta-position.

Although the amount of the structural unit derived from the first monovinyl compound (may be also referred to as "first monovinyl compound structural unit") based on the total amount of structural units of the porous resin bead of the invention is not particularly limited, its occupying amount per weight of the porous resin bead is preferably from 3.0 to 8.3 mmol/g, more preferably from 4.5 to 8.0 mmol/g. further preferably from 5.0 to 7.5 mmol/g.

When amount of the structural unit derived from the first monovinyl compound is smaller than the above-mentioned range, solvent resistance, heat stability and porosity of the porous resin bead may not be sufficient so that desired effects can hardly be expected when used in the solid-phase synthesis of a nucleic acid. Also, when its amount is larger than the above-mentioned range, degree of swelling in the organic solvent is lowered so that when used in the solid-phase synthesis of a nucleic acid, synthesized quantity of the nucleic acid becomes small, and further, purity of the nucleic acid is also reduced.

Although the amount of the structural unit derived from the divinyl compound (may be also referred to as "divinyl compound structural unit") based on the total amount of structural units of the porous resin bead of the invention is not particularly limited, its occupying amount per weight of the porous resin bead is preferably from 0.2 to 1.0 mmol/g, more preferably from 0.25 to 0.8 mmol/g, further preferably from 0.3 to 0.7 mmol/g.

When amount of the structural unit derived from the divinyl compound is smaller than the above-mentioned range, solvent resistance, heat stability and porosity of the porous resin bead may not be sufficient so that desired effects can hardly be expected when used in the solid-phase synthesis of a nucleic acid. Also, when its amount is larger than the above-mentioned range, degree of swelling in the organic solvent is lowered so that when used in the solid-phase synthesis of a nucleic acid, synthesized quantity of the nucleic acid may become small, and further, purity of the nucleic acid may be also reduced.

The porous resin bead of the invention swells and changes its volume when soaked in an organic solvent. Although the organic solvent is not particularly limited, preferred is acetonitrile or toluene, and more preferred is acetonitrile.

The swelling volume when the porous resin bead of the invention is soaked in acetonitrile is preferably from 3 to 6 ml/g, more preferably from 3.2 to 5.5 ml/g, further preferably from 3.4 to 5.0 ml/g. In addition, the swelling volume when the porous resin bead of the invention is soaked in toluene is preferably from 5 to 8 ml/g, more preferably from 5.2 to 7.7 ml/g, further preferably from 5.4 to 7.4 ml/g.

Since the porous resin bead of the invention shows a large swelling ratio in an organic solvent, reaction field of the nucleic acid synthesis employing the organic solvent can be enlarged, whereby, reactivity of the nucleic acid synthesis can be improved. Thus, according to the invention, there can be obtained a porous resin bead for use in solid-phase synthesis support, which renders it possible to synthesize a nucleic acid having both of the high synthesizing quantity and synthesizing purity, in comparison with the conventional porous resin beads for nucleic acid synthesis use.

Accordingly, in order to adjust swelling volume of the porous resin bead of the invention in an organic solvent within the above-mentioned range, it is necessary to consider amount of the structural unit derived from (meth)acrylonitrile (may be also referred to as "(meth)acrylonitrile structural unit") based on the total amount of the structural units of the porous resin bead.

The amount of the structural unit derived from (meth)acrylonitrile based on the total amount of the structural units of porous resin bead of the invention is from 1 to 6 mmol/g, preferably from 1.5 to 4 mmol/g, further preferably from 1.8 to 3 mmol/g.

When amount of the structural unit derived from (meth)acrylonitrile is smaller than the above-mentioned range, a desirable porous resin bead can hardly be obtained and the desired effect can hardly be expected when it is used in the solid-phase synthesis of a nucleic acid. Also, when the amount is larger than the above-mentioned range, the porous resin bead itself can hardly be formed. In addition, when the amount is larger than 6 mmol/g, there is a tendency that amount of the synthesized nucleic acid is lowered regardless of the small changes in the swelling ratio in two or more solvents.

Amount of the structural unit derived from (meth)acrylonitrile in the porous resin bead of the invention is measured by a total nitrogen analysis. Illustratively, this is calculated from the molecular weight of the structural unit derived from (meth)acrylonitrile, by putting a sample in a platinum pan, weighing it on a micro balance and then measuring the amount of nitrogen by a micro total nitrogen analyzer TN-110 (mfd. by Mitsubishi Chemical Corporation).

Although not particularly limited, amount of the structural unit derived from the second aromatic monovinyl compound (may be also referred to as "second aromatic monovinyl compound structural unit") based on the total weight of structural units of the porous resin bead of the invention is preferably from 0.05 to 1.5 mmol/g, more preferably from 0.1 to 1.0 mmol/g, further preferably from 0.2 to 0.8 mmol/g.

This is because its effect can hardly be obtained when amount of the structural unit derived from the second aromatic monovinyl compound is smaller than the above-mentioned range, while the porous resin bead itself can hardly be formed when the amount is larger than the above-mentioned range.

Regarding the amount of the "functional group capable of binding with carboxyl group by dehydration condensation reaction" possessed by the structural unit derived from the second aromatic monovinyl compound, in the porous resin bead of the invention, for example in the case of amino group, aminoalkyl group, hydroxyl group or hydroxyalkyl group, its occupying amount per weight of the porous resin bead is preferably from 0.05 to 1.5 mmol/g, more preferably from 0.1 to 1.0 mmol/g, further preferably from 0.2 to 0.8 mmol/g.

When amount of the "functional group capable of binding with carboxyl group by dehydration condensation reaction" is smaller than the above-mentioned range, there is a tendency that synthesized quantity of a nucleic acid becomes small when used as a support for solid-phase synthesis of nucleic acid. Also, when the amount is larger than the above-mentioned range, there is a tendency that purity of a nucleic acid is lowered when used as a support for solid-phase synthesis of nucleic acid.

Regarding the amount of the "functional group capable of binding with carboxyl group by dehydration condensation reaction" possessed by the structural unit derived from the second aromatic monovinyl compound, in the porous resin bead of the invention, for example in the case of amino group, aminoalkyl group, hydroxyl group or hydroxyalkyl group, it is measured by titration based on JIS K 0070. Illustratively, amount of the functional group can be calculated by acetylating the hydroxyl group of the objective solid-phase synthesis support with known amount of an acetylating reagent (acetic anhydride/pyridine) and then measuring the amount of acetic anhydride which was not consumed by the acetylation, by titration of potassium hydroxide.

The method for producing the porous resin bead of the invention is not particularly limited, and there may be mentioned, for example:

(1) a method for producing a porous resin bead, including allowing a first aromatic monovinyl compound, a divinyl compound, (meth)acrylonitrile and a second aromatic monovinyl compound which contains a functional group capable of binding with carboxyl group by dehydration condensation reaction to undergo suspension copolymerization using an organic solvent and water;

(2) a method for producing a porous resin bead, including synthesizing a porous resin bead through suspension copolymerization or the like and then introducing a functional group capable of binding with carboxyl group by dehydration condensation reaction into the structural unit derived from the second aromatic monovinyl compound; and the like.

In carrying out the suspension copolymerization, amount (feedstock amount) of the first aromatic monovinyl compound based on the total amount of the first aromatic monovinyl compound, divinyl compound, (meth)acrylonitrile and second aromatic monovinyl compound is preferably from 31 to 85% by mol, more preferably from 45 to 82% by mol, further preferably from 53 to 76% by mol.

In carrying out the suspension copolymerization, amount (feedstock amount) of the divinyl compound based on the total amount of the first aromatic monovinyl compound, divinyl compound, (meth)acrylonitrile and second aromatic monovinyl compound is preferably from 2 to 10% by mol, more preferably from 2.5 to 8% by mol, further preferably from 3 to 7% by mol.

In carrying out the suspension copolymerization, amount (feedstock amount) of the (meth)acrylonitrile based on the total amount of the first aromatic monovinyl compound, divinyl compound, (meth)acrylonitrile and second aromatic monovinyl compound is preferably from 10 to 60% by mol, more preferably from 13 to 40% by mol, further preferably from 18 to 30% by mol.

In carrying out the suspension copolymerization, amount (feedstock amount) of the second aromatic monovinyl compound based on the total amount of the first aromatic monovinyl compound, divinyl compound, (meth)acrylonitrile and second aromatic monovinyl compound is preferably from 0.5 to 15% by mol, more preferably from 1 to 10% by mol, further preferably from 2 to 8% by mol. This amount is the same for the aromatic monovinyl compound which becomes the base of the second aromatic monovinyl compound in the case of a production method including once synthesizing a porous resin bead through suspension copolymerization or the like and then introducing a "functional group capable of binding with carboxyl group by dehydration condensation reaction".

The suspension copolymerization is carried out by agitating and emulsifying a mixture of the above-mentioned respective compounds (each of the composing components of the porous resin bead of the invention to be subjected to suspension copolymerization (i.e., first aromatic monovinyl compound, divinyl compound, (meth)acrylonitrile and second aromatic monovinyl compound) is referred sometimes to as "monomer" hereinafter) and an organic solvent in water.

The organic solvent in carrying out the suspension copolymerization means a solvent other than water in suspension copolymerization system, and a hydrocarbon and an alcohol are suitably used. Illustratively as the hydrocarbon, an aliphatic saturated or unsaturated hydrocarbon or an aromatic hydrocarbon can be used, of which an aliphatic hydrocarbon having from 5 to 12 carbon atoms is preferable, and more preferably, there may be mentioned n-hexane, n-heptane, n-octane, isooctane, undecane, dodecane and the like. In addition, it is preferable to allow an alcohol to coexist in order to increase porosity of the beads obtained at this juncture (the alcohol to be used with the aim of increasing porosity is referred to as "porogen" hereinafter). As the alcohol according to the invention, an aliphatic alcohol can for example be mentioned, and the number of carbon atoms thereof is preferably from 5 to 9. As such an alcohol, illustratively, there can be mentioned 2-ethylhexanol, amyl alcohol (e.g., t-amyl alcohol), nonyl alcohol, 2-octanol, cyclohexanol and the like.

Weight ratio of the hydrocarbon and alcohol to be used in the suspension copolymerization can be optionally changed depending on the illustrative combination of the hydrocarbon and alcohol, and specific surface area of the solid-phase synthesis support can be increased thereby. Preferable blending ratio of the hydrocarbon and alcohol is from 1:9 to 6:4 by weight ratio.

Weight of the organic solvent at the time of suspension copolymerization is preferably from 0.5 to 2.5 times, more preferably from 0.8 to 2.2 times, further preferably from 1.0 to 2.0 times, based on the total weight of the above-mentioned respective monomers. When this value is larger or smaller than that, specific surface area of the obtained porous resin bead becomes small and quantity of the synthesis reaction product by chemical reaction using the beads becomes small.

According to the invention, the method itself for carrying out the suspension copolymerization may be carried out by applying a conventionally known method.

The dispersion stabilizer to be used in the suspension copolymerization is not particularly limited, and there can be used a conventionally known polyvinyl alcohol, polyacrylic acid, gelatin, starch, carboxymethylcellulose and the like hydrophilic protective colloid agents, and calcium carbonate, magnesium carbonate, calcium phosphate, valium sulfate, calcium sulfate, bentonite and the like slightly soluble powders, and the like. Although amount of the dispersion stabilizer is not particularly limited, it is preferably from 0.01 to 10% by weight based on the weight of water in the suspension copolymerization system. When this value is smaller, dispersion stability of suspension copolymerization may be spoiled and a large quantity of aggregates may be formed. When this value is larger, a large number of minute beads may be formed.

A polymerization initiator to be used in carrying out the suspension copolymerization is not particularly limited, and there can be used conventionally known dibenzoyl peroxide, dilauroyl peroxide, distearoyl peroxide, 1,1-di(t-butylperoxy)-2-methylcyclohexane, 1,1-di(t-hexylperoxy)-3,3,5-trimethylcyclohexane, 1,1-di(t-hexylperoxy)cyclohexane, 1,1-di(t-butylperoxy)-cyclohexane, di-t-hexyl peroxide, t-butylcumyl peroxide, di-t-butyl peroxide, 1,1,3,3-tetramethylbutylperoxy-2-ethyl hexanoate, t-hexylperoxy-2-ethyl hexanoate, t-butylperoxy-2-ethyl hexanoate, t-butylperoxyisopropyl monocarbonate and the like peroxides, and 2,2'-azobisisobutyronitrile, 2,2'-azobis-2-methylbutyronitrile, 2,2'-azobis-2,4-dimethylvaleronitrile and the like azo compounds. Adding amount of the polymerization initiator is not particularly limited, and it is possible to select an appropriate amount by those skilled in the art.

The reaction condition in carrying out suspension copolymerization can be optionally set, and for example, agitation of from 30 minutes to 48 hours at from 60 to 90° C. may be mentioned. The agitation rate is for example from 100 rpm to 1,000 rpm, preferably from 200 rpm to 500 rpm. By the suspension copolymerization, the first aromatic monovinyl compound-divinyl compound-(meth)acrylonitrile-second aromatic monovinyl compound copolymer can be obtained.

The thus obtained copolymer may be optionally subjected to washing, drying, classification and the like treatments. In addition, after synthesis of a porous resin bead by suspension copolymerization or the like, a functional group capable of binding with carboxyl group by dehydration condensation reaction may be introduced into the structural unit derived from the second aromatic monovinyl compound. The introducing method is as described in the foregoing.

The porous resin bead of the invention can be obtained via the above treatments. This porous resin bead can be used as a solid-phase synthesis support.

The "porous resin bead" of the invention is not always necessary to show strict spherical shape, and it may be at least in a granular shape. However, the porous resin bead of the invention (support for solid-phase synthesis) is preferably in a spherical shape from the viewpoint that its efficiency for filling in a solid-phase synthesis reaction column can be increased and it can hardly be broken.

The swelling volume of the porous resin bead of the invention also may be influenced not only by the amount of the structural unit derived from the (meth)acrylonitrile, but also by the median particle diameter and the median pore diameter.

The median particle diameter of the porous resin bead of the invention measured by a laser diffraction scattering method is not particularly limited, but is preferably from 1 to 1,000 μm, more preferably from 10 to 500 μm, further preferably from 20 to 300 μm. The median particle diameter of the porous resin bead of the invention is measured by a laser diffraction scattering method. Illustratively, average particle diameter is calculated by measuring it by a laser diffraction scattering type particle size distribution analyzer LA-950 (mfd. by Horiba, Ltd.) using 50% v/v ethanol aqueous solution as the dispersion medium.

The median particle diameter depends on the stirring condition before the commencement of polymerization in case of suspension polymerization, kind and amount of the porogen, and concentration of the dispersion stabilizer in carrying out the suspension polymerization. Accordingly, by adjusting these conditions, it is possible to adjust the median particle diameter within a desired range, and, as a result, swelling volume of the porous resin bead of the invention can be adjusted within a desired range. As the porogen, the aforementioned alcohol can be mentioned. In addition, enlargement of the median particle diameter under swelling condition contributes to the increase of swelling ratio of the porous resin bead.

The median pore diameter of the porous resin bead of the invention measured by a method of mercury penetration is not particularly limited, but is preferably from 1 to 1,000 nm, more preferably from 5 to 500 nm, further preferably from 10 to 300 nm, and most preferably from 20 to 100 nm.

The median pore diameter of the porous resin bead of the invention is measured by a mercury penetration method. Illustratively, 0.2 g of the porous resin bead is put into a mercury porosimeter PoreMaster 60-GT (mfd. by Quantachrome Instrument) and measured by the mercury penetration method under conditions of 140° in mercury contact angle and 480 dyn/cm in mercury surface tension.

The swelling volume of the porous resin bead of the invention is measured using a measuring cylinder. Illustratively, 1.00 g of the porous resin bead is put into a 10 ml capacity measuring cylinder and an excess amount of acetonitrile or toluene is added thereto and allowed to stand still at room temperature for 24 hours, and then the apparent volume is measured.

The porous resin bead of the invention can be used as a support for various chemical synthesis reactions, and can be used particularly effectively in the nucleic acid synthesis.

Regarding the nucleic acid synthesis using the porous resin bead of the invention, conventionally known methods may be applied. For example, the following nucleoside succinyl linker:

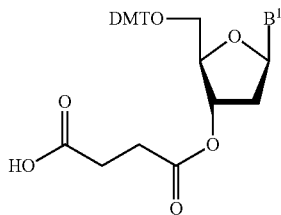

(in which DMT is a 5'-protection group, and $B_1$ is a base.) is bonded to a functional group on the porous resin bead of the invention which is capable of binding with carboxyl group by dehydration condensation reaction. Next, nucleoside phosphoramidite is bonded step by step from 5' end of this nucleoside in such a manner that it becomes a predetermined nucleotide sequence. This synthesis reaction can be carried out using an automatic synthesizer. For example, the reaction is repeated by successively feeding a 5'-OH deprotection agent, a nucleoside phosphoramidite solution, an amidite activator solution, an oxidizing agent solution, a capping agent solution, acetonitrile as a washing solution, and the like into the device's reaction column packed with the nucleoside succinyl linker-bonded porous resin bead. Finally, the desired nucleic acid can be obtained by cutting the succinyl linker moiety for example through its hydrolysis with an alkali solution. A conventionally known linker can be used, for example, a porous resin bead bonded to a nucleoside linker and having the following structure, and the like can be cited.

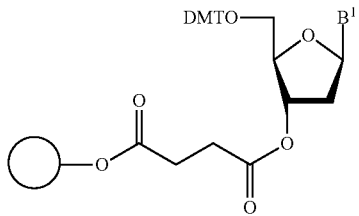

(in which the member represented by a large circle is a support for solid-phase synthesis, DMT is a 5'-protection group, and $B_1$ is a base.)

EXAMPLES

The following describes the invention further illustratively with reference to examples.

Inventive Example 1

A 500 ml capacity separable flask equipped with a condenser, an agitator and a nitrogen introducing tube was arranged on a constant temperature water bath and 2.5 g of polyvinyl alcohol (mfd. by KURARAY) and 250 g of distilled water were charged therein and stirred at 300 rpm to dissolve the polyvinyl alcohol. There was added a solution prepared by mixing and dissolving 33 g of styrene (mfd. by Wako Pure Chemical Industries), 8 g (5.4% by mol) of 4-chloromethylstyrene (mfd. by Tokyo Chemical Industry), 7 g (5.1% by mol) of divinylbenzene (55% content, mfd. by Wako Pure Chemical Industries), 12 g (30.8% by mol) of methacrylonitrile (mfd. by Wako Pure Chemical Industries), 60 g of 2-ethylhexanol (mfd. by Wako Pure Chemical Industries), 30 g of isooctane (mfd. by Wako Pure Chemical Industries) and 1 g of benzoyl peroxide (25% moisture, mfd. by NOF CORPORATION) was added to this and stirred (300 rpm) at room temperature in a stream of nitrogen, and then suspension copolymerization was carried out for 24 hours by rising the temperature to 80° C.

The polymerization product was washed by filtration using distilled water and acetone (mfd. by Wako Pure Chemical Industries) and dispersed in acetone to a total volume of about 1 L. This was allowed to stand for such a period of time that the precipitate did not become loose even when the container was slanted, and then the supernatant acetone was discarded. Classification of this precipitate was carried out by again adding acetone to a total volume of about 1 L and repeating the standing and acetone discharge operations. By filtering this dispersion and drying it under a reduced pressure, a porous resin bead containing a styrene-4-chloromethylstyrene-divinylbenzene-methacrylonitrile copolymer was obtained.

Next, 20 g of a powder of the porous resin bead containing the above-mentioned copolymer, 100 g of N,N-dimethylformamide (mfd. by Wako Pure Chemical Industries) and 5 g of potassium phthalimide (mfd. by Wako Pure Chemical Industries) were charged into a 500 ml capacity flask equipped with a condenser and an agitator and allowed to undergo the reaction at 90° C. for 6 hours while stirring. Next, this reaction product was washed by filtration using ethanol (mfd. by Wako Pure Chemical Industries) and filtered under a reduced pressure. A 150 g portion of ethanol and 30 g of hydrazine hydrate (mfd. by Wako Pure Chemical Industries) were added to entire quantity of the thus obtained beads and allowed to undergo the reaction under reflux for 6 hours. After completion of the reaction, the thus obtained reaction mixture was neutralized with hydrochloric acid and then washed by filtration using distilled water and acetone. By filtering this dispersion and drying it under a reduced pressure, a porous resin bead containing a styrene-4-aminomethylstyrene-divinylbenzene-methacrylonitrile copolymer was obtained.

Inventive Example 2

A 20 g portion of a powder of the porous resin bead containing a styrene-4-chloromethylstyrene-divinylbenzene-methacrylonitrile copolymer obtained in Inventive Example 1, 80 g of ethanol, 20 g of distilled water and 8 g of sodium hydroxide (mfd. by Wako Pure Chemical Industries) were put into a 500 ml capacity flask equipped with a condenser and an agitator and allowed to undergo the reaction at 75° C. for 18 hours while stirring. By filtering this dispersion and drying it under a reduced pressure, a porous resin bead containing a styrene-4-hydroxymethylstyrene-divinylbenzene-methacrylonitrile copolymer was obtained.

Inventive Example 3

A porous resin bead containing a styrene-4-acetoxystyrene-divinylbenzene-methacrylonitrile copolymer was obtained in the same manner as in Inventive Example 1, except that, in Inventive Example 1, as the monomers, there were used 39 g of styrene, 6 g (6.3% by mol) of 4-acetoxystyrene (mfd. by Sigma-Aldrich), 7 g (5.1% by mol) of divinylbenzene (55% content, mfd. by Wako Pure Chemical Industries), and 8 g (20.4% by mol) of methacrylonitrile.

The polymerization product obtained was washed by filtration, classified and dried under a reduced pressure in the same manner as in Inventive Example 1. Subsequently, 20 g of a powder of the above-mentioned copolymer bead, 80 g of ethanol, 50 g of distilled water and 2 g of sodium hydroxide were put into a 500 ml capacity flask equipped with a condenser, an agitator and a nitrogen introducing tube, and allowed to undergo the reaction at 75° C. for 18 hours while stirring. By filtering this dispersion and drying it under a reduced pressure, a porous resin bead containing a styrene-4-hydroxystyrene-divinylbenzene-methacrylonitrile copolymer was obtained.

Comparative Example 1

A porous resin bead containing a styrene-4-hydroxystyrene-divinylbenzene copolymer was obtained in the same manner as in Inventive Example 3, except that in Inventive Example 3, 49 g of styrene, 4 g of 4-acetoxystyrene, 7 g of divinylbenzene (and 0 g of methacrylonitrile) were used as the monomers and 2-ethylhexanol was changed to 52 g, and isooctane to 23 g.

Test Example 1

Measurement of Physical Properties of Porous Resin Beads

The following measurement of physical properties was carried out on the porous resin beads obtained in Inventive Examples 1 to 3 and Comparative Example 1.

(Median Particle Diameter)

Each sample to be measured was subjected to ultrasonic dispersion in a 50% v/v ethanol liquid. For this dispersion, Median particle diameter was measured by a laser diffraction/scattering type particle size distribution analyzer LA-920 (mfd. by Horiba, Ltd.) using the 50% v/v ethanol liquid as dispersion medium.

(Median Pore Diameter)

A 0.2 g portion of each sample to be measured was put into a mercury porosimeter PoreMaster 60-GT (mfd. by Quantachrome Instrument) and Median pore diameter was measured by the method of mercury penetration under conditions of 140° in mercury contact angle and 480 dyn/cm in mercury surface tension.

(Hydroxyl Group Quantity)

From 0.5 to 2 g of each sample to be measured was weighed and put into a flask, and 0.5 ml of an acetylation reagent (prepared by adding pyridine into 25 g of acetic anhydride adjusting the total volume to 100 ml) and 4.5 ml of pyridine were accurately added thereto. After a lapse of 2 hours by adjusting the mixture in the flask to 95 to 100° C., this was spontaneously cooled to room temperature and 1 ml of distilled water was added thereto. By heating the mixture for 10 minutes, the acetic anhydride which was not consumed by the acetylation was degraded. The whole contents in the flask were transferred into a beaker, diluted to a total volume of 150 ml with distilled water and then titrated with 0.5 N of potassium hydroxide aqueous solution. Separately from this, a blank assay was carried out by the same operation of the above without adding the sample to be measured.

The functional group quantity (hydroxyl group quantity) of the sample to be measured was calculated by the following formula (1). Herein, A (mmol/g) means amount of hydroxyl group in the sample to be measured, B (ml) is titrated volume of the potassium hydroxide aqueous solution in the blank assay, C (ml) is titrated volume of the potassium hydroxide aqueous solution in the measurement of sample to be measured, f is a factor of the potassium hydroxide aqueous solution and M (g) is weight of the weighed sample to be measured.

$$A(\text{mmol/g}) = (B-C) \times 0.5 \, (\text{mol/l}) \times f / M \quad (1)$$

(Content of Structural Unit Derived from Methacrylonitrile)

For each of the porous resin bead containing a styrene-4-chloromethylstyrene-divinylbenzene-methacrylonitrile copolymer obtained in Inventive Example 1 and the porous resin bead containing a styrene-4-hydroxystyrene-divinylbenzene-methacrylonitrile copolymer obtained in Inventive Example 3, from 2 to 3 mg portion of each sample to be measured was put into a platinum pan and weighed using a micro balance, and then subjected to measured by a total nitrogen analyzer TN-110 (mfd. by Mitsubishi Chemical Corporation). The content of the structural unit D derived from methacrylonitrile was calculated from the thus obtained N concentration (% by weight) using the following formula (2).

$$D \text{ content (mmol/g)} = (N \text{ concentration (\% by weight)} \times 10) / (N \text{ molecular weight} \times N \text{ numbers in } D) \quad (2)$$

(Amino Group Quantity)

For each of the porous resin bead containing a styrene-4-chloromethylstyrene-divinylbenzene-methacrylonitrile copolymer and porous resin bead containing a styrene-4-aminomethylstyrene-divinylbenzene-methacrylonitrile copolymer obtained in Inventive Example 1, from 2 to 3 mg portion of each sample to be measured was put into a platinum pan and weighed using a micro balance, and then subjected to measured by a total nitrogen analyzer TN-110 (mfd. by Mitsubishi Chemical Corporation).

The amino group quantity was calculated from the thus obtained N concentrations (% by weight) using the following formula (3). Herein, E (mmol/g) means amino group quantity of the sample to be measured, F (% by weight) is N concentration of the porous resin bead containing a styrene-4-aminomethylstyrene-divinylbenzene-methacrylonitrile copolymer, and G (% by weight) is N concentration of the porous resin bead containing a styrene-4-chloromethylstyrene-divinylbenzene-methacrylonitrile copolymer.

$$E \text{ (mmol/g)} = \{F-G\} \times 10 / N \text{ molecular weight} \quad (3)$$

(Swelling Volume in Acetonitrile)

A 1.00 g portion of a sample to be measured was put into a 10 ml capacity measuring cylinder and an excess amount of acetonitrile was then added thereto and allowed to stand still at room temperature for 24 hours, and then its apparent volume was measured.

These results are shown in Table 1.

TABLE 1

| | Unit | Inv. Ex. 1 | Inv. Ex. 2 | Inv. Ex. 3 | Comp. Ex. 1 |
|---|---|---|---|---|---|
| Median particle diameter | μm | 83 | 83 | 73 | 90 |
| Median pore diameter | nm | 32 | 32 | 46 | 53 |
| Hydroxyl group quantity | mmol/g | 0.50 | 0.10 | 0.57 | 0.42 |

TABLE 1-continued

| | Unit | Inv. Ex. 1 | Inv. Ex. 2 | Inv. Ex. 3 | Comp. Ex. 1 |
|---|---|---|---|---|---|
| (Meth)acrylonitrile content | mmol/g | 2.4 | 2.4 | 2.1 | 0.0 |
| Swelling volume in acetonitorile | ml/g | 4.2 | 4.2 | 4.1 | 3.8 |

In this connection, regarding the value of functional group quantity in Table 1, Inventive Example 1 represents amino group quantity and the others represent hydroxyl group quantity.

Test Example 2

Synthesis of DNA Oligonucleotide and Evaluation Thereof

Using the porous resin beads obtained in Inventive Examples 1 and 3 and Comparative Example 1, a DNA oligonucleotide was synthesized in the following manner and evaluation thereof was carried out.

In the case of the porous resin beads obtained in Inventive Examples 1 and 3, 1 g of porous resin bead, 0.27 g of DMT-dT-3'-succinate (mfd. by Beijing OM Chemicals), 0.14 g of HBTU (mfd. by Novabiochem), 0.13 ml of N,N-diisopropyl ethylamine (mfd. by Sigma-Aldrich) and 10 ml of acetonitrile (mfd. by Wako Pure Chemical Industries) were mixed, allowed to undergo the reaction at room temperature for 12 hours while stirring, washed through filtration using acetonitrile and then dried.

In the case of the porous resin bead obtained in Comparative Example 1, 1 g of the porous resin bead, 0.41 g of DMT-dT-3'-succinate, 0.21 g of HBTU, 0.19 ml of N,N-diisopropyl ethylamine and 10 ml of acetonitrile were mixed, allowed to undergo the reaction at room temperature for 12 hours while stirring, washed through filtration using acetonitrile and then dried.

Each of these porous resin beads was mixed with 2.5 ml of CapA (20% acetic anhydride/80% acetonitrile), 2.5 ml of CapB (20% N-methylimidazole/30% pyridine/50% acetonitrile), 0.025 g of 4-dimethylaminopyridine (mfd. by Sigma-Aldrich) and 5 ml of acetonitrile were mixed, allowed to undergo the reaction at room temperature for 12 hours while stirring, washed through filtration using acetonitrile and then dried under a reduced pressure to obtain a solid-phase synthesis support to which DMT-dT-3'-succinate was bonded. Bonded amount of DMT-dT-3'-succinate was calculated from absorbance measurement (412 nm) of DMT group which had been generated by deprotection using p-toluenesulfonic acid/acetonitrile solution.

A 0.8 to 1.1 g portion of the DMT-dT-3'-succinate-bonded porous resin bead obtained in the above was filled in a synthesis column (6.3 ml capacity) and set on AKTA oligopilot plus 100 (mfd. by GE Healthcare), and a DNA oligonucleotide of 20 mer mixed sequence was synthesized under conditions of 2 eq/synthesis scale in nucleoside phosphoramidite concentration and DMT-on. After the synthesis, the porous resin bead was dried, soaked in 25 ml of 28% aqueous ammonia and then allowed to undergo the reaction at 55° C. for 18 hours to carry out the cutting out of the DNA oligonucleotide and deprotection of the base amino group. The porous resin bead was separated by filter filtration and the OD yield of nucleic acid (equivalent to nucleic acid synthesis quantity) was calculated from the UV absorbance measurement (260 nm) of the filtrate. In addition, Full-length % (ratio of DNA oligonucleotide having the desired sequence length) was calculated from the HPLC (mfd. by Waters Corporation) measurement of the filtrate. The results are show in Table 2.

TABLE 2

| | Unit | Inv. Ex. 1 | Inv. Ex. 3 | Comp. Ex. 1 |
|---|---|---|---|---|
| OD yield | OD/μmol | 117 | 119 | 93 |
| Full-Length | % | 75 | 74 | 61 |

As is evident from Table 2, it was found that synthesized quantity (OD yield) and synthesis purity (Full-Length %) of the DNA oligonucleotide become high when the porous resin bead of the invention is used, in comparison with the comparative example.

While the present invention has been described in detail and with reference to specific embodiments thereof, it will be apparent to one skilled in the art that various changes and modifications can be made therein without departing from the spirit and scope thereof.

This application is based on Japanese patent application No. 2009-216215 filed on Sep. 17, 2009, and the entire contents of which are incorporated hereinto by reference. All references cited herein are incorporated in their entirety.

The invention provides a porous resin bead which is useful as a solid-phase synthesis support for nucleic acid synthesis. Since the porous resin bead of the invention achieves high nucleic acid synthesis quantity and synthesis purity, it becomes possible, owing to using this porous resin bead, to carry out nucleic acid synthesis more efficiently than the case of the use of conventional porous resin beads.

What is claimed is:

1. A porous resin bead comprising a first aromatic monovinyl compound-divinyl compound-(meth)acrylonitrile-second aromatic monovinyl compound copolymer, wherein the second aromatic monovinyl compound contains a group capable of binding with a carboxyl group by dehydration condensation reaction, wherein the porous resin bead has a swelling volume in acetonitrile of from 3 to 6 ml/g, and wherein the amount of a structural unit derived from (meth) acrylonitrile is from 1.8 to 3 mmol/g, wherein the first aromatic monovinyl compound is at least one compound selected from the group consisting of nucleus alkyl-substituted styrenes which are styrenes of which benzene ring moiety is substituted, α-alkyl-substituted styrenes, nucleus halogenated styrenes which are styrenes of which benzene ring moiety is halogenated, halogenated alkyl styrenes, hydroxystyrenes, hydroxymethylstyrenes, vinyl benzoates, sodium styrenesulfonates, cyanostyrenes, methoxystyrenes, ethoxystyrenes, butoxystyrenes, nitrostyrenes, and acyloxystyrenes, wherein the divinyl compound is at least one compound selected from the group consisting of aromatic divinyl compounds and di(meth)acrylate compounds, and wherein the second aromatic monovinyl compound is at least one compound selected from the group consisting of aminostyrene monomers or substitution products thereof, aminoalkylstyrene monomers or substitution products thereof, hydroxystyrene monomers or substitution products thereof, and hydroxyalkylstyrene monomers or substitution product thereof.

2. The porous resin bead described in claim 1, wherein the group capable of binding with a carboxyl group by dehydration condensation reaction is a group selected from the group consisting of an amino group, an aminoalkyl group, a hydroxyl group and a hydroxyalkyl group.

3. The porous resin bead described in claim 1, wherein an amount of the divinyl compound based on the total amount of monomers is from 2 to 10% by mol.

4. The porous resin bead described in claim 1, wherein the divinyl compound is divinylbenzene.

5. A method for producing a nucleic acid, comprising sequentially binding a nucleoside or nucleotide to the porous resin bead described in claim 1 via a cleavable linker, thereby obtaining an oligonucleotide.

6. The porous resin bead described in claim 3, wherein the amount of the divinyl compound based on the total amount of monomers is from 2.5 to 8% by mol.

7. The porous resin bead described in claim 3, wherein the amount of the divinyl compound based on the total amount of monomers is from 3 to 7% by mol.

* * * * *